US012729741B2

(12) United States Patent
Ishii et al.

(10) Patent No.: US 12,729,741 B2
(45) Date of Patent: Sep. 8, 2026

(54) SHOCK ABSORBER

(71) Applicant: Hitachi Astemo, Ltd., Hitachinaka (JP)

(72) Inventors: Hirohito Ishii, Hitachinaka (JP); Osamu Yuno, Hitachinaka (JP)

(73) Assignee: Hitachi Astemo, Ltd., Ibaraki (JP)

( * ) Notice: Subject to any disclaimer, the term of this patent is extended or adjusted under 35 U.S.C. 154(b) by 424 days.

(21) Appl. No.: 18/282,051

(22) PCT Filed: Mar. 4, 2022

(86) PCT No.: PCT/JP2022/009346
§ 371 (c)(1),
(2) Date: Sep. 14, 2023

(87) PCT Pub. No.: WO2022/215400
PCT Pub. Date: Oct. 13, 2022

(65) Prior Publication Data
US 2024/0191768 A1 Jun. 13, 2024

(30) Foreign Application Priority Data
Apr. 9, 2021 (JP) ................................ 2021-066573

(51) Int. Cl.
*F16F 9/18* (2006.01)
*F16F 9/34* (2006.01)
*F16F 9/512* (2006.01)

(52) U.S. Cl.
CPC .................. *F16F 9/18* (2013.01); *F16F 9/34* (2013.01); *F16F 9/5126* (2013.01)

(58) Field of Classification Search
CPC ........ F16F 9/18; F16F 9/34; F16F 9/46; F16F 9/5126; F16F 9/348; F16F 9/3488; F16F 9/465; F16F 9/512
See application file for complete search history.

(56) References Cited

U.S. PATENT DOCUMENTS

2011/0147147 A1* 6/2011 Murakami .............. F16F 9/464 188/314
2012/0247889 A1 10/2012 Yabe et al.
2022/0065321 A1* 3/2022 Yamaoka .................. F16F 9/34

FOREIGN PATENT DOCUMENTS

JP 2013-113425 6/2013
JP 5812650 11/2015
JP 2016-89898 5/2016

OTHER PUBLICATIONS

Japanese Patent No. JP 2019190609 to Matsuda et al published on Oct. 31, 2019.*

(Continued)

*Primary Examiner* — Pamela Rodriguez
(74) *Attorney, Agent, or Firm* — Wenderoth, Lind & Ponack, L.L.P.

(57) ABSTRACT

The invention is directed to provide a shock absorber in which hydraulic fluid is restrained from leaking out from a gap between a sub-check valve provided at a passage opening of an orifice passage and a disc valve. The sub-check valve (133) is biased toward the opening (126) of the orifice passage (130) using a biasing disc (135) (biasing member) of substantially equal diameter to the sub-check valve (133). This makes it possible to restrain hydraulic fluid in a first chamber (2A) from leaking out from a gap between a disc valve (121) and the sub-check valve (133) into a second chamber (2B) when piston velocity during an extension stroke is low (0.1 m/s or lower, exclusive zero), and thus obtain an intended damping force.

9 Claims, 6 Drawing Sheets

(56) References Cited

OTHER PUBLICATIONS

International Search Report issued May 17, 2022 in corresponding International Application No. PCT/JP2022/009346, with English language translation.
Written Opinion of the International Searching Authority issued May 17, 2022 in corresponding International Application No. PCT/JP2022/009346, with English language translation.

* cited by examiner

SHOCK ABSORBER

TECHNICAL FIELD

The invention relates to shock absorbers that control a hydraulic fluid flow relative to piston stroke to vary damping force.

BACKGROUND ART

Patent Literature 1 discloses a damping force adjustable shock absorber 1 configured to close an opening 54 (passage opening) of an orifice passage which is formed in a check valve 13 (disc valve) by using a sub-check valve disc 45 (sub-check valve).

CITATION LIST

Patent Literature

PTL 1: Japanese Patent No. 5812650

SUMMARY OF INVENTION

Technical Problem

According to the shock absorber disclosed in Patent Literature 1, during the stroke where the sub-check valve disc 45 is closed, hydraulic fluid might enter a gap between the sub-check valve disc 45 and a seat disc 46, pass through the orifice passage, and leak out of a cylinder chamber, resulting in failure of obtaining intended damping force.

The invention is directed to provide a shock absorber in which hydraulic fluid is restrained from leaking out from a gap between a sub-check valve provided at a passage opening of an orifice passage and a disc valve.

Solution to Problem

A shock absorber of the invention comprises a cylinder in which hydraulic fluid is sealingly contained; a reservoir in which hydraulic fluid and gas are sealingly contained; a piston inserted in the cylinder in a slidable manner and configured to separate an interior portion of the cylinder into a first chamber and a second chamber; a base valve configured to separate the second chamber and the reservoir from each other; a first check valve provided in the piston and configured to allow a hydraulic fluid flow from the second chamber side to the first chamber side; a second check valve provided in the base valve and configured to allow a hydraulic fluid flow from the reservoir side to the second chamber side; a passage connecting the first chamber and the reservoir; and a damping force adjustment mechanism configured to be capable of adjusting damping force from outside between soft characteristics of a low damping force and hard characteristics of a high damping force by controlling a hydraulic fluid flow in the passage. At least either one of the first check valve and the second check valve is provided with orifice passages in parallel. The orifice passages are provided with a sub-check valve at passage openings. The sub-check valve is configured to open at lower pressure than the check valve, in which the orifice passages are provided in parallel, and allow hydraulic fluid to flow in the same direction. The sub-check valve is provided with a biasing member of substantially equal diameter to the sub-check valve, the biasing member being configured to bias the sub-check valve toward the passage openings.

One embodiment of the invention makes it possible, in a shock absorber where orifice passages are configured in a disc valve stacked on a piston, to restrain hydraulic fluid from leaking out from a gap between a sub-check valve provided at passage openings of the orifice passages and the disc valve.

DESCRIPTION OF EMBODIMENTS

First Embodiment

A first embodiment of the invention will be discussed with reference to the attached drawings.

Figure 1:
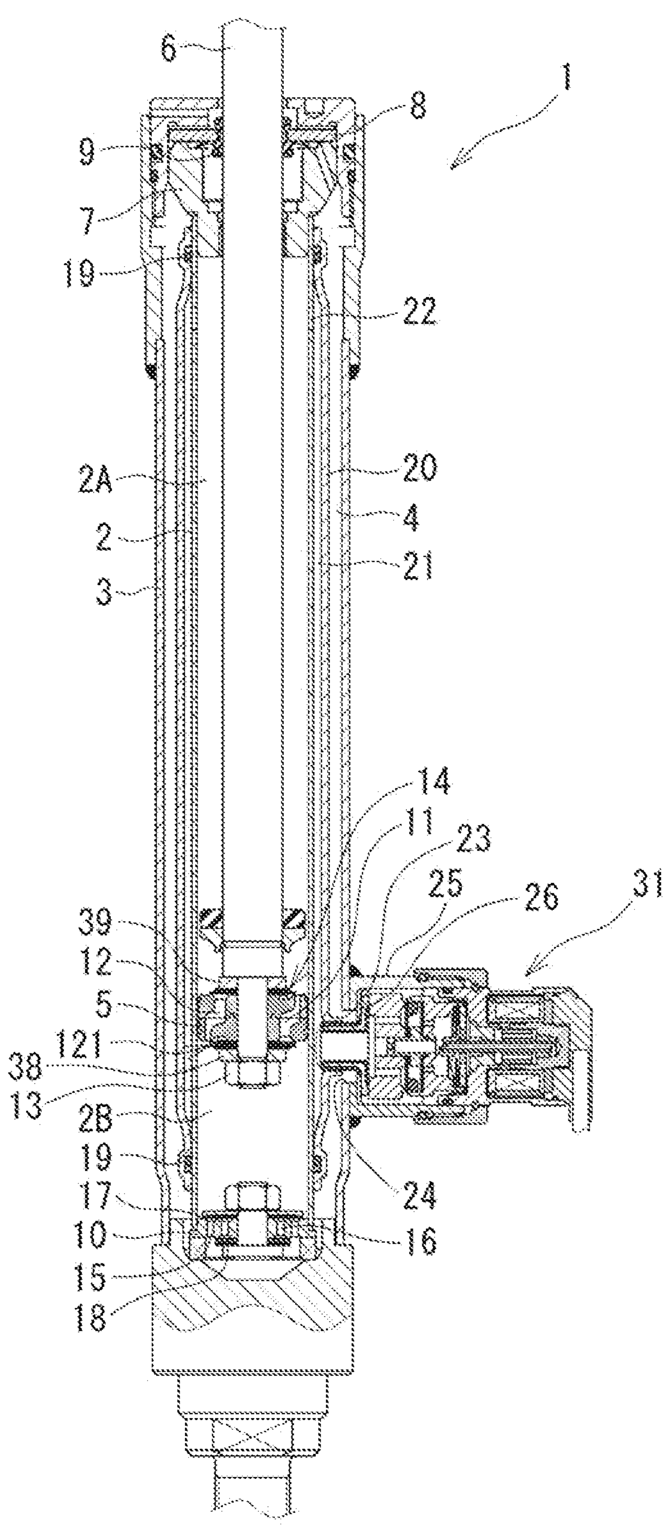
FIG. 1 is a cross-sectional view of a shock absorber according to a first embodiment.
Figure 2:
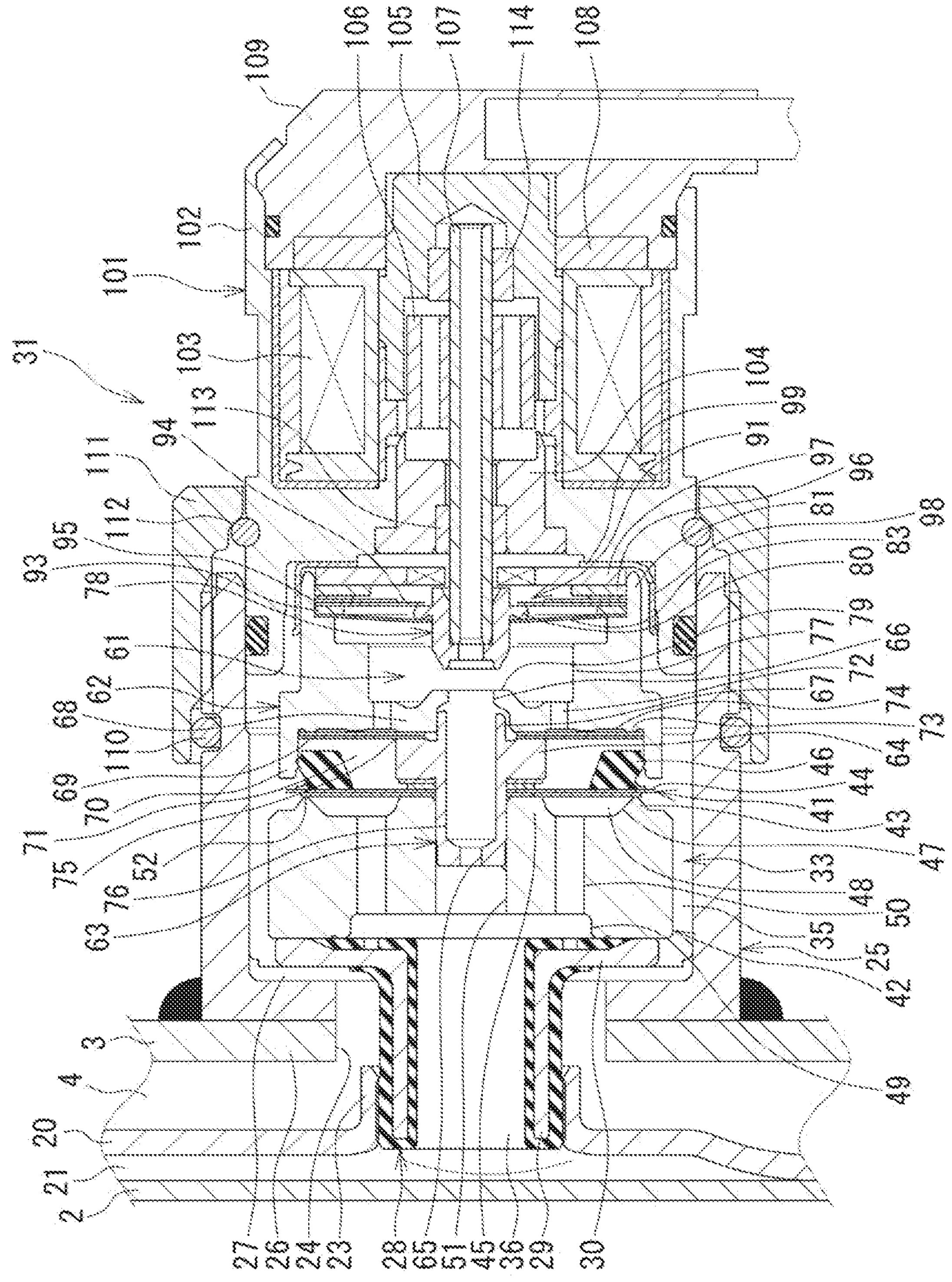
FIG. 2 is an enlarged view of a damping force adjustment mechanism shown in FIG. 1.

A shock absorber 1 illustrated in FIG. 1 is a damping force adjustable hydraulic shock absorber with a damping force adjustment mechanism 31 attached to a lateral wall of an outer tube 3, that is, a so-called damping force adjustable hydraulic shock absorber with a laterally-attached control valve. For convenience sake, a vertical direction in FIG. 1 is referred to as a "vertical direction." A leftward direction (left side) in FIG. 2 is referred to as a "cylinder direction (cylinder side)," and a rightward direction (right side) in FIG. 2 is referred to as a "counter cylinder direction (counter cylinder side)."

The shock absorber 1 has a multicylinder structure in which a cylinder 2 is provided inside the outer tube 3. Formed between the cylinder 2 and the outer tube 3 is a reservoir 4. A piston 5 is inserted in the cylinder 2 in a slidable manner. The piston 5 separates an interior portion of the cylinder 2 into two chambers including a first chamber 2A and a second chamber 2B. The shock absorber 1 comprises a piston rod 6 with a lower end side (one end side) coupled to the piston 5 and an upper end side (the other end side) extending through the first chamber 2A to the outside of the cylinder 2. The piston rod 6 extends through a rod guide 7 that is attached to an upper end portion of the cylinder 2. The first chamber 2A is sealed from outside by an oil seal 9 that is fitted onto a washer 8.

The piston 5 is provided with an extension-side passage 11 and a compression-side passage 12 which bring the first chamber 2A and the second chamber 2B into communication. The extension-side passage 11 is provided with a disc valve 121. The disc valve 121 is opened when pressure on the first chamber 2A side reaches predetermined pressure, and releases the pressure on the first chamber 2A side to the second chamber 2B side. Likewise, the compression-side passage 12 is provided with a disc valve 14 (first check valve) that allows a hydraulic fluid flow from the second chamber 2B to the first chamber 2A. The disc valve 121 and the disc valve 14 are pressurized and clamped between washers 38, 38 by tightening a nut 13 that is screwed onto a lower end portion of the piston rod 6.

A base valve 10 is provided in a lower end portion of the cylinder 2. The base valve 10 separates the second chamber 2B and the reservoir 4 from each other. The base valve 10 is provided with an extension-side passage 15 and a compression-side passage 16 which bring the second chamber 2B and the reservoir 4 into communication. The extension-side passage 15 is provided with a check valve 17 (second check valve) that allows a hydraulic fluid flow from the reservoir 4 side to the second chamber 2B side. The compression-side passage 16 is provided with a disc valve 18. The disc valve 18 is opened when pressure on the second chamber 2B side reaches predetermined pressure, and releases the pressure on the second chamber 2B side to the reservoir 4 side. Hydraulic fluid is sealingly contained in the cylinder 2. Hydraulic fluid and gas are sealingly contained in the reservoir 4.

A separator tube 20 is attached to an outer periphery of the cylinder 2. Formed between the cylinder 2 and the separator tube 20 is an annular fluid path 21 that is sealed by a pair of upper and lower seal members 19, 19. A passage 22 is provided in an upper portion-side wall of the cylinder 2. The passage 22 brings the annular fluid path 21 and the first chamber 2A into communication. A cylindrical connection port 23 is provided in a lower portion-side wall of the separator tube 20 so as to protrude toward the counter cylinder side. An attachment hole 24 is provided in a lateral wall of the outer tube 3 coaxially with the connection port 23. A cylindrical case 25 is provided in the lateral wall of the outer tube 3 so as to surround the attachment hole 24.

As illustrated in FIG. 2, the damping force adjustment mechanism 31 is accommodated in the case 25. The damping force adjustment mechanism 31 comprises a valve block 33 in which valve components are integrally formed, and a solenoid block 101 in which solenoid components are integrally formed. The valve block 33 includes a main valve 41 of a backpressure type, a pilot valve 61 that controls a valve opening pressure of the main valve 41, and a failsafe valve 91 provided downstream of the pilot valve 61. In short, the damping force adjustment mechanism 31 is a pilot-type pressure control valve that controls the valve opening pressure of the pilot valve 61.

A joint member 28 extends through the attachment hole 24 of the outer tube 3. The joint member 28 includes a cylindrical tube portion 29 with a cylinder-side end portion inserted in the connection port 23, and a flange portion 30 (outer flange) that is provided at a counter cylinder-side opening peripheral edge of the tube portion 29 and disposed inside the case 25. The tube portion 29 and the flange portion 30 are covered with seal material. The flange portion 30 includes a cylinder-side end surface that abuts against a counter cylinder-side end surface of an inner flange portion 26 of the case 25, and a counter cylinder-side end surface that abuts against a cylinder-side annular end surface (reference sign omitted) of a main body 42. A flow path 35 formed at an outer periphery of the valve block 33 and the reservoir 4 are in communication with each other through a plurality of grooves 27 provided in the inner flange portion 26 of the case 25.

The valve block 33 comprises the annular main body 42, an annular pilot body 62, and a pilot pin 63 coupling the main body 42 and the pilot body 62. An annular seat portion 43 is formed in an outer peripheral edge portion of a counter cylinder-side end surface of the main body 42. The seat portion 43 protrudes toward the counter cylinder side. An outer peripheral edge portion of a main disc 44 abuts against the seat portion 43 in a separatable/seatable manner.

An inner peripheral portion of the main disc 44 is clamped between an inner seat portion 45 of the main body 42 and a large diameter portion 64 of the pilot pin 63. An annular packing 46 is provided at a counter cylinder-side outer peripheral portion of the main disc 44. An annular concave portion 47 is provided in a counter cylinder-side end surface of the main body 42. An annular passage 48 is formed between the main body 42 and the main disc 44 by the main disc 44 being seated on the seat portion 43. The annular passage 48 comes into communication with the flow path 35 through an orifice 52 that is formed in the main disc 44. A concave portion 49 is formed at the center of a cylinder-side end surface of the main body 42. The concave portion 49 and the counter cylinder-side annular concave portion 47 (annular passage 48) are in communication with each other through a plurality of passages 50 (FIG. 2 shows only two) formed in the main body 42.

The pilot pin 63 is formed to have a bottomed cylinder-like shape that is open at the counter cylinder side. An inlet orifice 65 is formed in a cylinder-side bottom portion of the pilot pin 63. A cylinder side of the pilot pin 63 is press-fitted in an axial hole 51 of the main body 42. A counter cylinder side of the pilot pin 63 is press-fitted in an axial hole 66 of the pilot body 62. A plurality of grooves 67 are formed in a counter cylinder-side outer peripheral surface of the pilot pin 63. The plurality of grooves 67 extend in an axial direction (horizontal direction in FIG. 2).

The pilot body 62 is formed to have a substantially bottomed cylinder-like shape that is open at the counter cylinder side. A flexible disc 69 is provided on the cylinder side of the pilot body 62. The flexible disc 69 is clamped by an inner peripheral portion 68 of the pilot body 62 and the large diameter portion 64 of the pilot pin 63. A cylindrical portion 70 that is coaxial with the pilot body 62 is formed in a cylinder-side outer peripheral portion of the pilot body 62. The packing 46 of the main valve 41 slidably abuts against an inner peripheral surface (reference sign omitted) of the cylindrical portion 70. A pilot chamber 71 is thus defined on a counter cylinder side (rear surface) of the main disc 44. The pressure in the pilot chamber 71 acts on the main disc 44 in a valve closing direction (direction of pushing the seat portion 43).

A plurality of passages 72 (FIG. 2 shows only two) extending in an axial direction are provided in a bottom portion of the pilot body 62 at regular intervals in a circumferential direction. An annular seat portion 73 is provided in a cylinder-side end surface of the pilot body 62. Inside the seat portion 73, an annular chamber 74 is formed by the flexible disc 69 being seated on the seat portion 73. A cylinder side of the passage 72 opens into the chamber 74. The flexible disc 69 is bent by receiving inner pressure of the pilot chamber 71, to thereby impart volume elasticity to the pilot chamber 71.

The flexible disc 69 is configured by stacking a plurality of discs. An inner peripheral portion of a disc which abuts against the large diameter portion 64 of the pilot pin 63 is provided with a notch 75 that bring the grooves 67 into communication with the pilot chamber 71. This allows the hydraulic fluid in the first chamber 2A to flow through the passage 22, the annular fluid path 21, and a flow path 36 (axial hole) of the joint member 28 to be introduced into the damping force adjustment mechanism 31. The hydraulic fluid then flows through an inlet passage (introduction passage), namely, the inlet orifice 65, an axial hole 76 of the pilot pin 63, the grooves 67, and the notch 75 to be introduced into the pilot chamber 71. The first chamber 2A is connected to the reservoir 4 through passages. To be specific, the hydraulic fluid in the first chamber 2A flows through the passage 22, the annular fluid path 21, and the flow path 36 (axial hole) of the joint member 28 to be introduced into the damping force adjustment mechanism 31 and further flows through the plurality of grooves 27 formed in the case 25 and the attachment hole 24 formed in the outer tube 3 to enter the reservoir 4.

A concave portion 77 is formed at a counter cylinder side of the pilot body 62. An annular seat portion 79 (valve seat) is formed at the center of a bottom portion of the concave portion 77. A valve element 78 abuts against the annular seat portion 79 in a separatable/seatable manner. The seat portion 79 is provided at an opening peripheral edge of the axial hole 66 of the pilot body 62, through which the hydraulic fluid passes. The valve element 78 is formed into a substantially cylindrical shape. A cylinder-side end portion of the valve element 78 is formed to have a tapered shape. An outer flange-shaped spring bearing portion 80 is provided at a counter cylinder side of the valve element 78. The valve element 78 is biased by a pilot spring 83 in a direction away from the seat portion 79 (counter cylinder direction).

Formed on the counter cylinder side of the pilot body 62 is a cylindrical portion 81. The pilot spring 83, a spacer 93, a failsafe disc 94, a retainer 95, a spacer 96, and a washer 97 are stacked on the cylindrical portion 81 in the order from the cylinder side. The stacked components are covered with a cap 98 that is attached onto an outer periphery of the cylindrical portion 81. Formed in the cap 98 is a notch 99 functioning as a passage that brings the concave portion 77 (valve chamber) and the flow path 35 into communication with each other.

The solenoid block 101 is configured by integrally installing a coil 103, a core 104, a core 105, a plunger 106, and a hollow actuating rod 107 coupled to the plunger 106 into a solenoid case 102. A spacer 108 and a cover 109 are inserted in a counter cylinder side of the solenoid case 102. A counter cylinder-side end edge portion of the solenoid case 102 is subjected to plastic forming, to thereby apply an axial force to the components in the solenoid case 102.

The plunger 106 is supported to be axially movable by a sleeve 113 and a sleeve 114 which are provided in the core 104 and the core 105, respectively. The plunger 106 generates thrust force corresponding to an electric current value in response to energization of the coil 103. The thrust force generated by the plunger 106 acts to move the valve element 78 in a direction toward the seat portion 79 (cylinder direction) against biasing force of the pilot spring 83.

A cylinder side of the solenoid case 102 is inserted in a counter cylinder-side opening of the case 25. A gap between the solenoid case 102 and the case 25 is sealed by a seal member 110. A cylinder side of the actuating rod 107 protrudes into the concave portion 77 (valve chamber). The valve element 78 is attached to a cylinder-side end portion of the actuating rod 107. The solenoid case 102 and the case 25 are fixed together by tightening a nut 111 already screwed to the case 25 to compress an annular retaining ring 112. Consequently, the valve block 33 and the solenoid block 101 are joined (integrated) together.

When the coil 103 is not energized, the valve element 78 is biased in the counter cylinder direction by the pilot spring 83, and the spring bearing portion 80 of the valve element 78 is brought into abutment against (seated on) the failsafe disc 94. When the coil 103 is energized, thrust force acting in the cylinder direction is generated in the plunger 106, and the actuating rod 107 moves in the cylinder direction against the biasing force of the pilot spring 83, which causes the valve element 78 to be seated on the seat portion 79. Valve opening pressure of the valve element 78 is controlled by changing the electric current value (hereinafter, referred to as "control current value") for energization of the coil 103. In a soft mode where the control current value is small, the biasing force of the pilot spring 83 and the thrust force of the plunger 106 are in balance, and therefore, the pilot valve 61 is opened by a fixed valve opening amount.

The main part of the first embodiment will be now discussed with reference to FIG. 3.

The disc valve 121 is configured with a plurality of discs clamped between the washer 38 and an annular inner seat portion 122 that is formed in an inner peripheral edge portion on the second chamber 2B side ("lower side" in FIG. 3) of the piston 5. An annular outer seat portion 123 is formed in an outer peripheral edge portion on the second chamber side of the piston 5. The disc valve 121 includes a disc 125 that abuts against the annular outer seat portion 123 in a separatable/seatable manner. The disc 125 is provided with a plurality of circular openings 126 (FIG. 3 shows only one) at regular intervals in a circumferential direction. An annular concave portion 124 is formed between the inner seat portion 122 and the outer seat portion 123.

The disc valve 121 includes a disc 127 that is placed on a counter piston side ("lower side" in FIG. 3) of the disc 125. The disc 127 has an equal outer diameter to the disc 125. A plurality of notches 128 (FIG. 3 shows only one) are provided at an outer peripheral edge of the disc 127 at regular intervals in a circumferential direction. The notches 128 extend radially inwards ("leftward direction" in FIG. 3). The number of notches 128 is the same as the number of the openings 126 provided in the disc 125. The disc 125 and the disc 127 are positioned around an axis so that the openings 126 and the notches 128 coincide (communicate) with each other. The disc valve 121 includes a plurality of discs 129 (six in the first embodiment) which are placed on the counter piston side of the disc 127. The discs 129 each have equal outer diameter to the disc 125 and the disc 127. Although the discs are thus configured in the first embodiment, the disc 127 and the disc 125 may have different outer diameters, and the notches 128 may be provided at irregular intervals. The positioning of the disc 125 and the disc 127 is desirably carried out. Depending on the shape and size of the notches or openings, however, the positioning does not necessarily have to be done.

Figure 3:
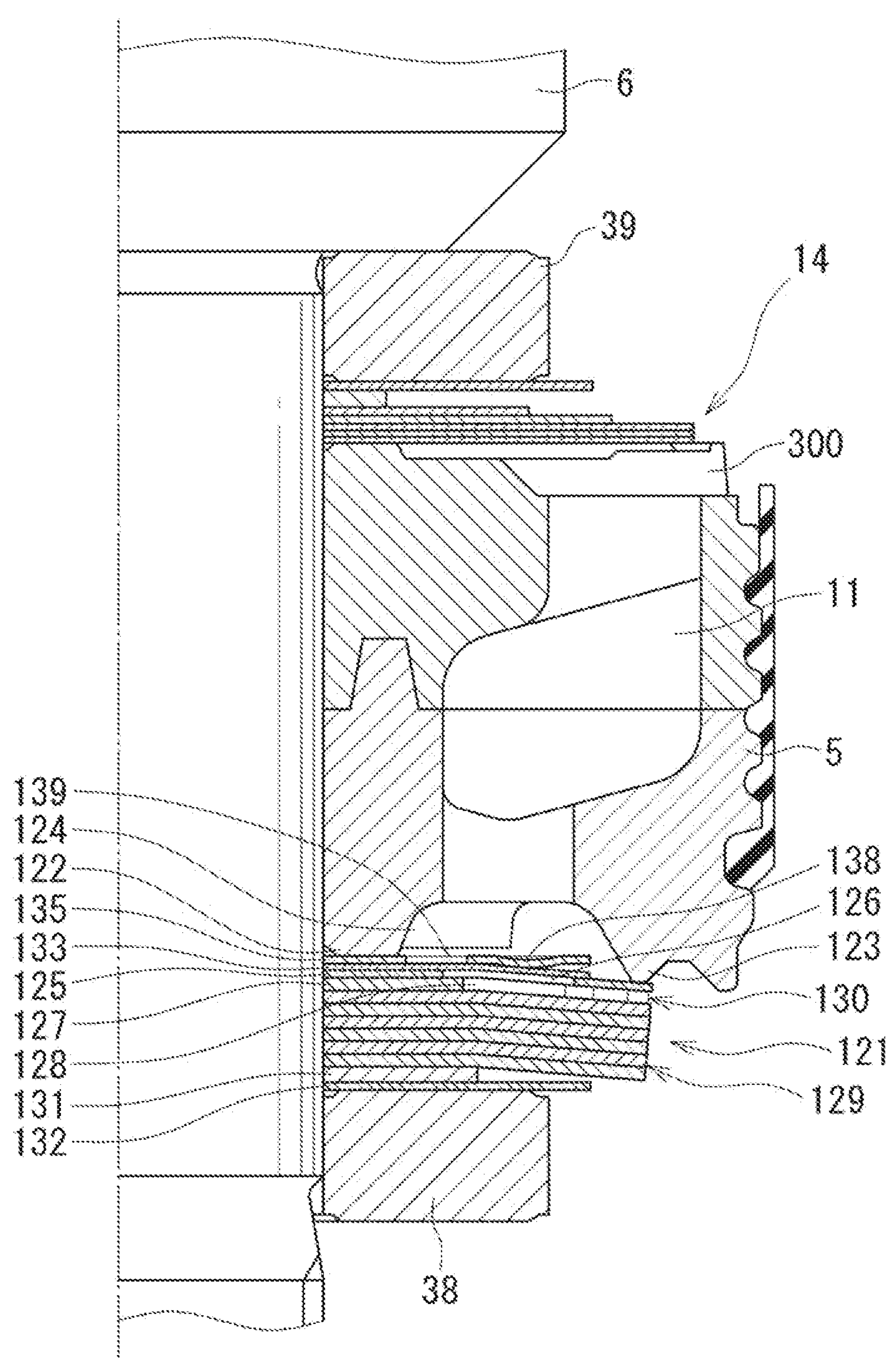
FIG. 3 is an enlarged view of a main part in FIG. 1.

A plurality of orifice passages 130 (FIG. 3 shows only one) comprising the notches 128 of the disc 127 and the openings 126 of the disc 125 are accordingly configured in the disc valve 121 (the plurality of discs stacked on the piston 5). The orifice passages 130 are provided on the second chamber 2B side of the piston 5 and disposed in parallel in the disc valve 14 (first check valve) that is provided in the first chamber 2A of the piston 5. The orifice passages 130 allow the hydraulic fluid in the second chamber 2B to flow through the extension-side passage 11 into the first chamber 2A when piston velocity during a compression stroke is low (0.1 m/s or lower, exclusive of zero). Orifice area of each of the orifice passages 130 equals area of a rectangular cross-section of each of the notches 128. A spacer 131 and a retainer 132 are stacked on the counter piston side of the discs 129.

A disc-shaped sub-check valve 133 is provided on a piston side ("upper side" in FIG. 3) of the disc 125 in a stacked manner. An outer diameter of the sub-check valve 133 is so set that the sub-check valve 133 is capable of closing the openings 126 of the disc 125 and therefore the openings 126 (passage openings) of the orifice passages 130. The outer diameter of the sub-check valve 133 is further so set that an outer peripheral edge of the sub-check valve 133 does not contact the piston 5, that is, the outer peripheral edge does not interfere with valve opening (not hinder the separation of the sub-check valve 133 from the disc 125). The sub-check valve 133 as a valve element is not necessarily configured to allow a one-way flow and completely inhibit a flow in the other direction. The sub-check valve 133 may be configured to allow a slight amount of hydraulic fluid to flow in the other direction.

The outer seat portion 123 is larger in protrusion amount from the piston 5 as compared to the inner seat portion 122. In other words, a given step is formed between the inner seat portion 122 and the outer seat portion 123. Consequently, the disc valve 121 is pushed up by the outer seat portion 123 to be bent (elastically deformed), and set load is applied to the disc valve 121.

A biasing disc 135 (biasing member) is provided on a piston side of the sub-check valve 133 in a stacked manner. The biasing disc 135 biases the sub-check valve 133 to the counter piston side toward the disc valve 121 and pushes the sub-check valve 133 against the disc 125 (makes the sub-check valve 133 tightly contact with the disc 125), to thereby close the openings 126 (passage openings) of the orifice passages 130.

Figure 4:
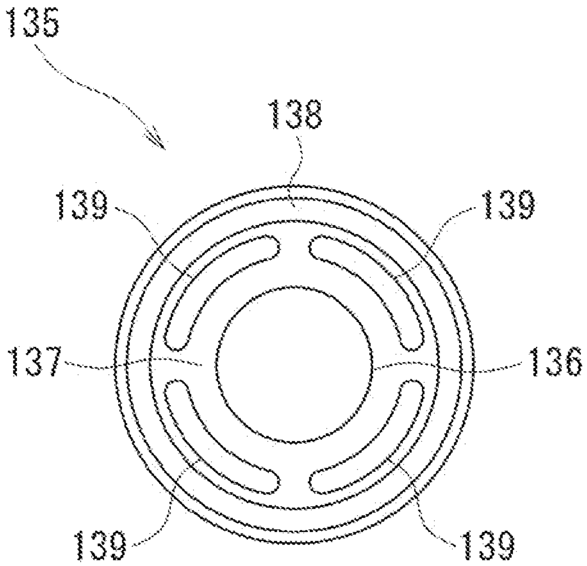
FIG. 4 is a plan view of a biasing disc according to the first embodiment.

As illustrated in FIG. 4, the biasing disc 135 includes an axial hole 136 (insertion hole) through which the piston rod 6 extends. An inner peripheral portion 137 is formed at a peripheral edge of the axial hole 136. The inner peripheral portion 137 is clamped between the inner seat portion 122 of the piston 5 and the disc valve 121 together with an inner peripheral portion (reference sign omitted) of the sub-check valve 133. Formed in the disc 135 is a protrusion 138 that extends along an outer peripheral edge of the disc 135 into an annular shape.

A cross-section of the protrusion 138 along an axial plane of the biasing disc 135 is formed into an arc that protrudes to the counter piston side ("lower side" in FIG. 3). The protrusion 138 is so disposed as to face the openings 126 (passage openings) of the orifice passages 130 (disc 125). An outer peripheral portion of the sub-check valve 133 is accordingly pushed toward the openings 126 of the orifice passages 130. The biasing disc 135 has substantially equal diameter to the sub-check valve 133. The substantially equal diameter here means the outer diameter of the biasing disc 135 which does not interfere the valve opening of the sub-check valve 133 and also makes it possible to dispose the protrusion 138 so that the protrusion 138 faces the openings 126 of the orifice passages 130. The substantially equal diameter may be outer diameter equal to outer diameter of the sub-check valve 133.

The biasing disc 135 includes a plurality of holes 139 (four in the first embodiment) which are formed in an inner peripheral side of the protrusion 138. The holes 139 extend along the protrusion 138 at constant width and are disposed at an outer periphery of the axial hole 136 at regular intervals. Biasing force of the biasing disc 135 is so set that the sub-check valve 133 is opened with lower pressure than the disc valve 14 (first check valve) that is provided on the first chamber 2A side of the piston 5. In other words, the sub-check valve 133 is opened with lower pressure than the disc valve 14 during the compression stroke, to thereby generate damping force having orifice characteristics brought by the orifice passages 130.

The next discussion explains a hydraulic fluid flow in the shock absorber 1.

During an extension stroke, the disc valve 14 (first check valve) of the piston 5 is closed due to a pressure increase in the first chamber 2A, and the hydraulic fluid in the first chamber 2A is pressurized before the disc valve 121 is opened. The pressurized hydraulic fluid flows through the passage 22, the annular fluid path 21, and the flow path 36 (axial hole) of the joint member 28 to be introduced into the damping force adjustment mechanism 31. The hydraulic fluid of amount corresponding to the amount of motion of the piston 5 flows out of the reservoir 4, opens the check valve 17 of the base valve 10, and enters the second chamber 2B. When the pressure in the first chamber 2A reaches the valve opening pressure of the disc valve 121 of the piston 5, and the disc valve 121 is opened, the pressure in the first chamber 2A is released into the second chamber 2B. This prevents an excessive pressure increase from occurring in the first chamber 2A.

During the compression stroke, the disc valve 121 of the piston 5 and the check valve 17 (second check valve) of the base valve 10 are closed due to a pressure increase in the second chamber 2B. Before the disc valve 18 of the base valve 10 is opened, the hydraulic fluid in the second chamber 2B is pressurized. When the piston velocity during the compression stroke is low (0.1 m/s or lower, exclusive of zero), the hydraulic fluid in the second chamber 2B opens the sub-check valve 133 against the biasing force of the biasing disc 135 (biasing member), then flows through the orifice passages 130 formed in the disc valve 121, the annular concave portion 124, and the extension-side passage 11, and a piston orifice 300 formed by coining, and enters the first chamber 2A while the disc valve 14 is closed. The shock absorber 1 generates damping force having orifice characteristics brought by the orifice passages 130.

When the disc valve 14 (first check valve) of the piston 5 is opened to cause the hydraulic fluid in a piston's lower chamber 2B to enter the first chamber 2A, hydraulic fluid of a cubic volume corresponding to entry of the piston rod 6 into the cylinder 2 flows out of the first chamber 2A and passes through the passage 22, the annular fluid path 21, and the flow path 36 (axial hole) of the joint member 28 to be introduced into the damping force adjustment mechanism 31. When the pressure in the second chamber 2B reaches valve opening pressure of the disc valve 18 of the base valve 10, and the disc valve 18 is opened, the pressure in the second chamber 2B is released into the reservoir 4. This prevents an excessive pressure increase from occurring in the second chamber 2B.

The hydraulic fluid introduced in the damping force adjustment mechanism 31 is introduced into the pilot chamber 71 through an inlet passage, namely, the inlet orifice 65, the axial hole 76 of the pilot pin 63, the grooves 67, and the notch 75. Before the main valve 41 is opened (when the piston velocity is in a low-velocity area), the hydraulic fluid introduced in the damping force adjustment mechanism 31 flows into the reservoir 4 through the inlet orifice 65, the axial hole 76 of the pilot pin 63, the concave portion 77 (valve chamber) of the pilot body 62, the notch 99 formed in the cap 98, the flow path 35 formed at the outer periphery of the valve block 33, the plurality of grooves 27 formed in the case 25, and the attachment hole 24 formed in the outer tube 3.

When the piston velocity increases, and the pressure of the hydraulic fluid introduced in the damping force adjustment mechanism 31 reaches the valve opening pressure of the main valve 41, the hydraulic fluid opens the main valve 41 and flows into the reservoir 4 through the flow path 35 formed at the outer periphery of the valve block 33, the plurality of grooves 27 formed in the case 25, and the attachment hole 24 formed in the outer tube 3.

As described above, during both the extension and compression strokes of the piston rod 6, before the main valve 41 is opened (when the piston velocity is in the low-velocity area), the damping force adjustment mechanism 31 generates damping force by the hydraulic fluid passing through the inlet orifice 65 and the pilot valve 61. After the main valve 41 is opened (when the piston velocity is in a middle-velocity area), the damping force adjustment mechanism 31 generates damping force having valve characteristics corresponding to the opening degree of the main valve 41. The damping force generated by the damping force adjustment mechanism 31 can be directly controlled by controlling the energization of the coil 103 and adjusting the valve opening pressure of the pilot valve 61.

If the thrust force of the plunger 106 is lost at the time of occurrence of failure, such as disconnection of the coil 103 and malfunction of an in-vehicle controller, the valve element 78 is moved to the counter cylinder side using the biasing force of the pilot spring 83 (serving also as failsafe spring) to open the pilot valve 61. At the same time, the spring bearing portion 80 of the valve element 78 is brought into abutment against the failsafe disc 94 to block the communication between an inner flow path (reference sign omitted) of the valve block 33 and the outer flow path 35 of the valve block 33.

At this time, the valve opening pressure of the failsafe valve 91 is adjusted to control the flow of the hydraulic fluid flowing from the first chamber 2A through the passages, namely, the passage 22, the annular fluid path 21, the flow path 36 (axial hole) of the joint member 28, the damping force adjustment mechanism 31, the plurality of grooves 27 formed in the case 25, and the attachment hole 24 formed in the outer tube 3 into the reservoir 4. Accordingly, a given damping force can be generated in the event of failure. It is also possible to adjust the inner pressure of the pilot chamber 71 and therefore the valve opening pressure of the main valve 41, which makes it possible to obtain the given damping force in the event of failure.

According to a conventional shock absorber (hereinafter, referred to as a "conventional shock absorber") in which the sub-check valve 133 is provided at the openings 126 (passage openings) of the orifice passages 130 configured in the disc valve 121 (the plurality of discs stacked on the piston 5), the outer seat portion 123 is higher than the inner seat portion 122 (larger than the inner seat portion 122 in protrusion amount from the piston 5), and the sub-check valve 133 is not seated on the outer seat portion 123 (the sub-check valve 133 is smaller in outer diameter than the outer seat portion 123).

In the conventional shock absorber, therefore, when the piston velocity during the extension stroke is low (0.1 m/s or lower, exclusive of zero), the hydraulic fluid in the first chamber 2A might leak out from a gap between the disc valve 121 (disc 125) and the sub-check valve 133 into the second chamber 2B. As a result, the conventional shock absorber might fail to obtain intended damping force (predetermined damping force).

To solve this problem, according to the first embodiment, the shock absorber 1 is so configured that the sub-check valve 133 is biased toward the openings 126 of the orifice passages 130 using the biasing disc 135 (biasing member) of substantially equal diameter to the sub-check valve 133.

This restrains the hydraulic fluid in the first chamber 2A from leaking out from the gap between the disc valve 121 and the sub-check valve 133 into the second chamber 2B when the piston velocity during the extension stroke is low (0.1 m/s or lower, exclusive of zero) and enables the shock absorber 1 to obtain the intended damping force.

According to the first embodiment, the outer peripheral side of the sub-check valve 133 is biased (pressed) in a counter piston direction by the annular protrusion 138 that is formed in the biasing disc 135 to tightly contact the disc valve 121. It is then possible to surely restrain a gap from being created between the disc valve 121 and the sub-check valve 133.

According to the first embodiment, the biasing disc 135 is provided with the plurality of holes 139 between the protrusion 138 and the axial hole 136 (insertion hole), and the plurality of holes 139 extend along the inner periphery of the protrusion 138, which can make the biasing disc 135 low in rigidity. The sub-check valve 133 therefore can be opened before the opening of the disc valve 14 (first check valve) provided on the first chamber 2A side of the piston 5 when the piston velocity during the compression stroke is low. It is then possible to obtain damping force having orifice characteristics brought by the orifice passage 130.

Figure 5:
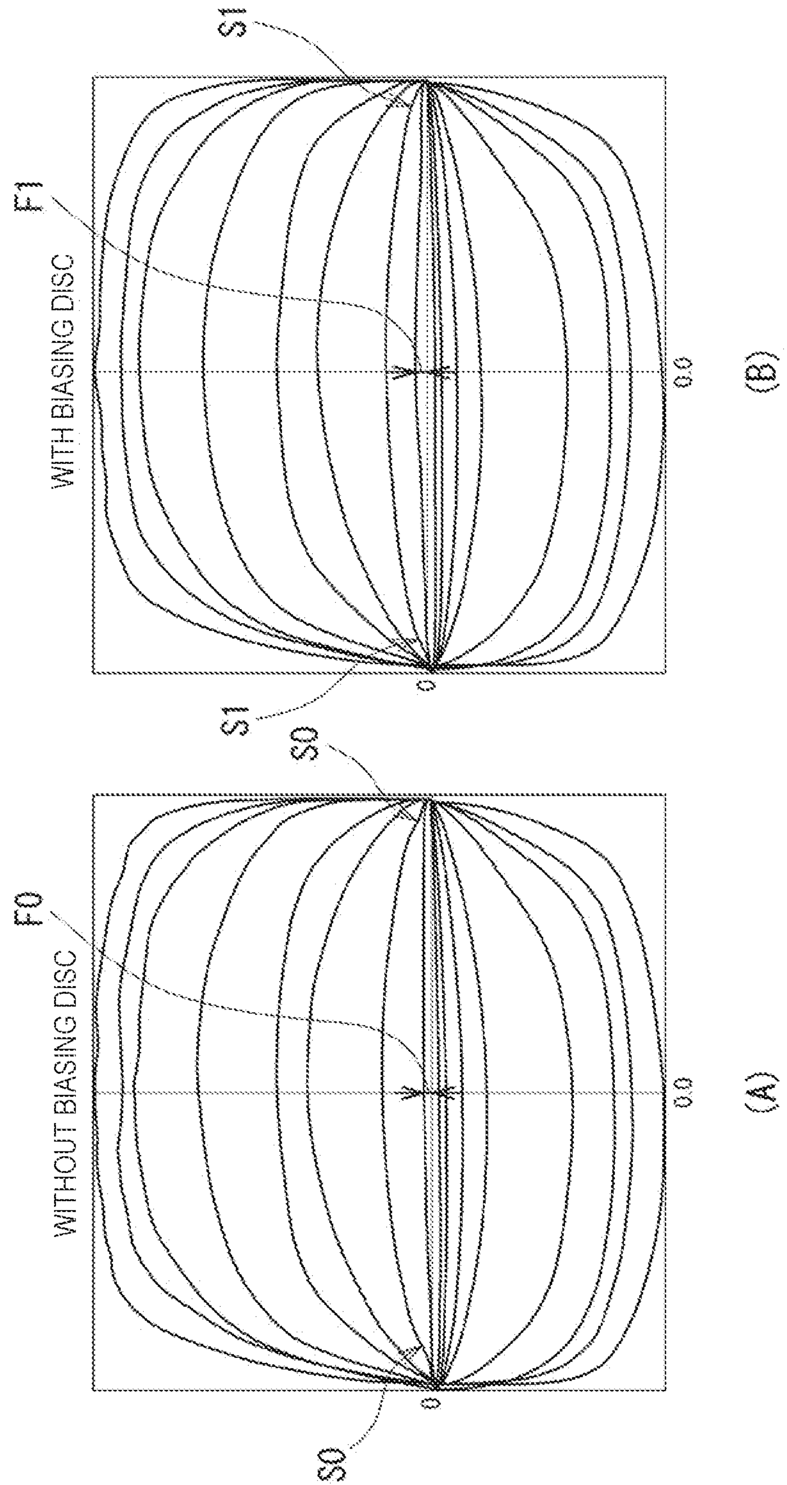
FIG. 5 explains the first embodiment and includes 5(A) showing a Lissajous waveform of a conventional shock absorber and 5(B) showing a Lissajous waveform of the shock absorber according to the first embodiment.

The following discussion explains, with reference to FIG. 5, operation and advantageous effects of the biasing disc 135 (biasing member) that is used in the first embodiment. FIG. 5(A) is a Lissajous waveform that is observed in a conventional shock absorber without the biasing disc 135. FIG. 5(B) is a Lissajous waveform that is observed in the shock absorber 1 according to the first embodiment with the biasing disc 135.

First, a comparison is made between damping force F0 (see FIG. 5(A)) generated by the conventional shock absorber and damping force F1 (see FIG. 5(B)) generated by the shock absorber 1 according to the first embodiment under the condition that the piston velocity during the extension stroke is very low (for example, 0.05 m/s). It is obvious from FIG. 5 that the damping force F1 generated by the shock absorber 1 according to the first embodiment is larger than the damping force F0 generated by the conventional shock absorber (F1>F0). The damping force F1 generated by the shock absorber 1 according to the first embodiment is roughly "2," where the damping force F0 generated by the conventional shock absorber is "1."

It is then presumed that, according to the conventional shock absorber without the biasing disc 135, when the piston velocity during the extension stroke is low, the hydraulic fluid in the first chamber 2A leaks out from the gap between the disc valve 121 (disc 125) and the sub-check valve 133, which releases the damping force (results in failure of obtaining the intended damping force).

In contrast with the conventional shock absorber, the shock absorber 1 according to the first embodiment uses the biasing disc 135 to bias the sub-check valve 133 toward the openings 126 (passage openings) of the orifice passages 130 and thus restrains the hydraulic fluid from leaking out from the gap between the disc valve 121 and the sub-check valve 133, to thereby obtain the intended damping force even when the piston velocity during the extension stroke is very low. As described above, the first embodiment can enhance the ride comfort of a vehicle under a situation where the piston velocity is very low.

The next comparison is made between a rising waveform S0 (see FIG. 5(A)) of an extension-side damping force that is generated by the conventional shock absorber at piston stroke reversal and a rising waveform S1 (see FIG. 5(B)) of an extension-side damping force that is generated by the shock absorber 1 according to the first embodiment at piston stroke reversal under the condition that the piston velocity is low (for example, 0.5 m/s).

It is understood from FIG. 5 that the rising waveform S0 of the extension-side damping force that is generated by the conventional shock absorber is missing at the piston stroke reversal. In other words, it is presumed that, in the conventional shock absorber without the biasing disc 135, at the piston stroke reversal while the piston velocity is low, the hydraulic fluid in the first chamber 2A leaks out from the gap between the disc valve 121 (disc 125) and the sub-check valve 133 into the second chamber 2B, and this delays the rising of the extension-side damping force.

In contrast with the conventional shock absorber, the shock absorber 1 according to the first embodiment uses the biasing disc 135 to bias the sub-check valve 133 toward the openings 126 (passage openings) of the orifice passages 130 and thus restrains the hydraulic fluid leakage from the gap between the disc valve 121 and the sub-check valve 133. Accordingly, missing does not occur in the waveform S1, and the rising of damping force is not delayed at the piston stroke reversal while the piston velocity is low. The shock absorber 1 therefore can obtain the intended damping force. In this manner, the first embodiment can enhance the ride comfort of a vehicle under a situation where piston velocity is low.

Comparing a Lissajous waveform that is observed during a compression stroke in the conventional shock absorber with a Lissajous waveform that is observed during a compression stroke in the shock absorber 1 according to the first embodiment, the Lissajous waveform that is observed during the compression stroke in the conventional shock absorber and the Lissajous waveform that is observed during the compression stroke in the shock absorber 1 according to the first embodiment are substantially the same. In other words, to provide the biasing disc 135 to the sub-check valve 133 does not make a difference to the damping force generated during the compression stroke in the shock absorber 1 of the first embodiment, as compared to the damping force generated during the compression stroke in the conventional shock absorber. The shock absorber 1 of the first embodiment can obtain the equal damping force to the conventional shock absorber during the compression stroke.

The embodiment does not necessarily have to be carried out in the aforementioned mode but may be configured, for example, as below.

The shock absorber 1 may be so configured that the valve structure (hereinafter, referred to as a "valve structure of the first embodiment") including the orifice passages 130, the sub-check valve 133, and the biasing disc 135 (biasing member) is provided on the first chamber 2A side of the piston 5, instead of being provided on the second chamber 2B side of the piston 5 as in the first embodiment. In other words, instead of disposing the sub-check valve 133 on the second chamber 2B side of the piston 5 as in the first embodiment, the shock absorber 1 may be configured in such a manner that the disc valve 121 is provided on the first chamber 2A side of the piston 5 so that the biasing disc 135 (biasing member) disposed on the most counter piston side is used to bias the sub-check valve 133 in the direction of the piston toward the openings 126 (passage openings) of the orifice passages 130 formed in the disc valve 121. If the shock absorber 1 is thus configured, the piston orifice 300 formed by coining is not provided.

According to the shock absorber 1 thus configured, when the piston velocity during the extension stroke is low, the hydraulic fluid in the second chamber 2B is restrained from leaking out from the gap between the disc valve 121 and the sub-check valve 133 into the first chamber 2A. This makes it possible to obtain the intended damping force. The first embodiment shows the configuration in which, when the piston velocity during the extension stroke is low, the hydraulic fluid in the second chamber 2B is restrained from leaking out from the gap between the disc valve 121 and the sub-check valve 133 into the first chamber 2A. Instead, the invention may be applied to the compression stroke.

The shock absorber 1 may also be configured so that the valve structure of the first embodiment is provided to the base valve 10. More specifically, the first embodiment provides the orifice passages 130 in parallel to the disc valve 14 (first check valve) that is provided to the piston 5 and provides the sub-check valve 135 to the openings 126 (passage openings) of the orifice passages 130. Instead, the shock absorber 1 may be configured in such a manner that the disc valve 121 is provided on the reservoir 4 side of the base valve 10; the orifice passages 130 are provided in parallel to the check valve 17 (second check valve) that is provided to the base valve 10; and the biasing disc 135 (biasing member) is used to bias the sub-check valve 133 to a counter base valve side toward the openings 126 (passage openings) of the orifice passages 130 that is formed in the disc valve 121.

If the shock absorber 1 is configured in the foregoing manner, when the piston velocity during the compression stroke is low, the hydraulic fluid in the second chamber 2B is restrained from leaking out from the gap between the disc valve 121 and the sub-check valve 133 into the reservoir 4. This makes it possible to obtain the intended damping force.

The discussion about the first embodiment explains the mode in which the aforementioned valve structure is applied to the shock absorber 1 comprising the damping force adjustment mechanism 31 (pilot-type pressure control valve) that adjusts the valve opening pressure of the pilot valve 61 through the energization of the coil 103. However, the valve structure of the first embodiment may also be applied to a shock absorber, not shown, comprising a damping force adjustment mechanism (pilot-type flow rate control valve) that adjusts valve opening area of the pilot valve 61 through the energization of the coil 103.

The foregoing configuration provides equivalent operation and advantageous effects to those of the first embodiment.

Second Embodiment

Figure 6:
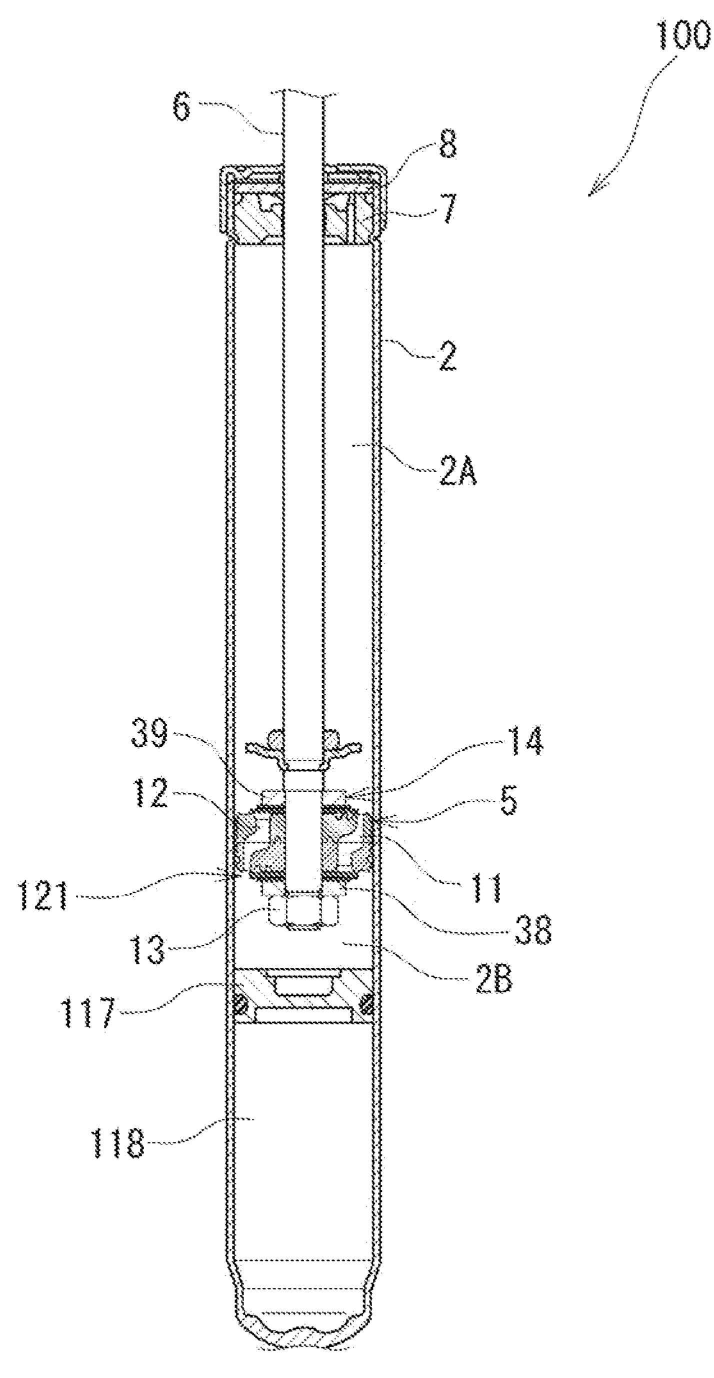
FIG. 6 is a cross-sectional view of a shock absorber according to a second embodiment.

A second embodiment will be now discussed with reference to FIGS. 3 and 6. This discussion explains differences from the first embodiment. The same names and reference signs are used for matters which are common with the first embodiment.

According to the first embodiment, the valve structure illustrated in FIG. 3 is applied to the multicylinder shock absorber 1 with the damping force adjustment mechanism 31 attached to the lateral wall of the outer tube 3, that is, a so-called damping force adjustable hydraulic shock absorber with a laterally-attached control valve. In the second embodiment, the valve structure (see FIG. 3) of the first embodiment is applied to a single cylinder shock absorber 100.

The shock absorber 100 includes a cylinder 2 in which hydraulic fluid is sealingly contained, and a piston 5 and a free piston 117 which are slidably inserted in the cylinder 2. The piston 5 separates an interior portion of the cylinder 2 into two chambers including a first chamber 2A and a second chamber 2B, whereas the free piston 117 defines a gas chamber 118 in a bottom portion of the cylinder 2. A disc valve 14 (first damping valve) is provided on the first chamber 2A side of the piston 5. The disc valve 14 allows a hydraulic fluid flow from the second chamber 2B to the first chamber 2A.

A disc valve 121 comprising a plurality of discs is stacked on the second chamber 2B side of the piston 5. As illustrated in FIG. 3, orifice passages 130 are configured in the disc valve 121 to be disposed in parallel in the disc valve (first damping valve). A sub-check valve 133 is provided to openings 126 (passage openings) of the orifice passages 130. The sub-check valve 133 is opened with lower pressure than the disc valve 14 and allows hydraulic fluid to flow in the same direction (direction from the second chamber 2B toward the first chamber 2A). The sub-check valve 133 is provided with the biasing disc 135 (biasing member) that biases the sub-check valve 133 toward the openings 126 (passage openings) of the orifice passages 130.

In the second embodiment, when the piston velocity during the extension stroke is low, the hydraulic fluid in the first chamber 2A is restrained from leaking out from a gap between the disc valve 121 and the sub-check valve 133 into the second chamber 2B. The second embodiment therefore can obtain the intended damping force and also can obtain equivalent operation and advantageous effects to the first embodiment.

The present embodiment is so configured that the biasing disc 135 is provided separately from the sub-check valve 133. However, the invention may be configured, for example, in such a manner that an R portion protruding toward an annular concave portion 124 side is formed in the sub-check valve to be located at least near the openings 126 so that the sub-check valve 133 itself generates biasing force toward the disc valve 121 side without separately providing a biasing disc.

The invention may also be configured in such a manner that a biasing seat portion configured to bias the sub-check valve 133 is provided between an inner seat portion 122 and an outer seat portion 123 of the piston 5 so that the sub-check valve 133 is biased toward the disc valve 121 side by the biasing seat portion. If the invention is thus configured, the biasing seat portion is preferably designed to be located at such a position and have such protrusion height as not to interfere with the opening of the sub-check valve 133.

The biasing disc 135 does not necessarily have to have a disc-like shape as in the second embodiment. The biasing disc 135 may be a star-shaped spring or a coil spring.

The invention is not limited to the embodiments discussed above but may be modified in various ways. For example, the embodiments are discussed to clearly describe the invention in details and do not necessarily have to comprise all the configurations mentioned above. It is possible to partially replace the configuration of any of the embodiments with that of another embodiment and also incorporate the configuration of any of the embodiments into that of another embodiment. The configuration of any of the embodiments may be partially combined or replaced with the configuration of another embodiment or may be deleted.

The present patent application claims priority under Japanese Patent Application No. 2021-066573 filed on Apr. 9, 2021. The entire disclosure of Japanese Patent Application No. 2021-066573 filed on Apr. 9, 2021 including the description, claims, drawings and abstract is incorporated herein by reference in its entity.

REFERENCE SIGN LIST

1: Shock absorber, 2: Cylinder. 2A: First chamber, 2B: Second chamber, 4: Reservoir, 5: Piston, 6: Piston rod, 10: Base valve, 14: Disc valve (First check valve), 17: Check valve (Second check valve), 31: Damping force adjustment mechanism, 126: Opening (Passage opening), 130: Orifice passage, 133: Sub-check valve (valve element), 135: Biasing disc (biasing member)

The invention claimed is:

1. A shock absorber comprising:

a cylinder in which hydraulic fluid is sealingly contained;

a reservoir in which hydraulic fluid and gas are sealingly contained;

a piston inserted in the cylinder in a slidable manner and configured to separate an interior portion of the cylinder into a first chamber and a second chamber;

a base valve configured to separate the second chamber and the reservoir from each other;

a first check valve provided in the piston and configured to allow a hydraulic fluid flow from the second chamber to the first chamber;

a second check valve provided in the base valve and configured to allow a hydraulic fluid flow from the reservoir to the second chamber;

a passage connecting the first chamber and the reservoir; and a damping force adjustment mechanism configured to be capable of adjusting a damping force from outside between soft characteristics of a low damping force and hard characteristics of a high damping force by controlling a hydraulic fluid flow in the passage, the first check valve being provided with orifice passages in parallel, the orifice passages being provided with a sub-check valve at passage openings of the orifice passages, the sub-check valve being configured to open at a lower pressure than the first check valve and allow hydraulic fluid to flow in a same direction, the sub-check valve being provided with a biasing member of substantially equal diameter to that of the sub-check valve, the biasing member being configured to bias the sub-check valve toward the passage openings, wherein the biasing member includes a protrusion formed at formed on an outer peripheral side of the biasing member and a hole formed on a radially inner side with respect to the protrusion, the protrusion being configured to generate a biasing force toward the sub-check valve, wherein the sub-check valve is configured as a disc, wherein a disc valve is provided, the disc valve comprising a plurality of discs including the sub-check valve, wherein each orifice passage is partially configured by a respective notch extending radially inward from an outer peripheral edge of a first disc of the plurality of discs, wherein each passage opening is provided on a second disc of the plurality of discs, the first and second discs being in abutment with each other, wherein the hole is arranged such that a radially inner end of the hole is located radially inward of radially inner ends of the passage openings, wherein the hole is arranged such that a radially outer end of the hole is located radially outward of the radially inner ends of the passage openings, and wherein the protrusion is disposed so as to face the passage openings.

2. The shock absorber according to claim 1, wherein the biasing member is an annular disc.

3. The shock absorber according to claim 2, wherein the protrusion extends along an outer periphery of the biasing member so as to form an annular shape.

4. The shock absorber according to claim 2, wherein the hole of the biasing member comprises a plurality of holes, the biasing member being provided with an insertion hole arranged farther radially inward than the plurality of holes, the insertion hole being used for a clamping fixation to the piston.

5. The shock absorber according to claim 1, wherein the damping force adjustment mechanism is a pilot-type pressure control valve configured to control a valve opening pressure of a pilot valve.

6. The shock absorber according to claim 1, wherein the damping force adjustment mechanism is a pilot-type flow rate control valve configured to control an opening area of a pilot valve.

7. The shock absorber according to claim 1, wherein piston velocity when the first and second check valves are open is 0.1 m/s or lower, exclusive of zero.

8. A shock absorber comprising:

a cylinder in which hydraulic fluid is sealingly contained;

a reservoir in which hydraulic fluid and gas are sealingly contained;

a piston inserted in the cylinder in a slidable manner and configured to separate an interior portion of the cylinder into a first chamber and a second chamber;

a base valve configured to separate the second chamber and the reservoir from each other;

a first check valve provided in the piston and configured to allow a hydraulic fluid flow from the second chamber to the first chamber;

a second check valve provided in the base valve and configured to allow a hydraulic fluid flow from the reservoir to the second chamber;

a passage connecting the first chamber and the reservoir; and a damping force adjustment mechanism configured to be capable of adjusting a damping force from outside between soft characteristics of a low damping force and hard characteristics of a high damping force by controlling a hydraulic fluid flow in the passage, the first check valve being provided with orifice passages in parallel, the orifice passages being provided with a sub-check valve at passage openings of the orifice passages, the sub-check valve being configured to open at a lower pressure than the first check valve and allow hydraulic fluid to flow in a same direction, the first check valve being disposed in the first chamber, the sub-check valve being disposed in the second chamber, the sub-check valve being provided with a biasing member configured to bias the sub-check valve toward the passage openings, wherein the biasing member includes a protrusion formed on an outer peripheral side of the biasing member and a hole formed on a radially inner side with respect to the protrusion, the protrusion being configured to generate a biasing force toward the sub-check valve, wherein the sub-check valve is configured as a disc, wherein a disc valve is provided, the disc valve comprising a plurality of discs including the sub-check valve, wherein each orifice passage is partially configured by a respective notch extending radially inward from an outer peripheral edge of a first disc of the plurality of discs, wherein each passage opening is provided on a second disc of the plurality of discs, the first and second discs being in abutment with each other, wherein the hole is arranged such that a radially inner end of the hole is located radially inward of radially inner ends of the passage openings, wherein the hole is arranged such that a radially outer end of the hole is located radially outward of the radially inner ends of the passage openings, and wherein the protrusion is disposed so as to face the passage openings.

9. The shock absorber according to claim 8, wherein the orifice passages are formed in the plurality of discs, the plurality of discs being stacked on the piston, and wherein the biasing member is configured to generate the biasing force acting toward a counter piston side.

* * * * *